US008495400B2

(12) United States Patent
Fulkerson et al.

(10) Patent No.: US 8,495,400 B2
(45) Date of Patent: Jul. 23, 2013

(54) ENERGY-EFFICIENT TRANSITIONING AMONG DEVICE OPERATING MODES

(75) Inventors: Christopher R. Fulkerson, Longmont, CO (US); Bradley J. Gill, Longmont, CO (US); Abhay T. Kataria, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 701 days.

(21) Appl. No.: 12/242,037

(22) Filed: Sep. 30, 2008

(65) Prior Publication Data

US 2010/0083017 A1    Apr. 1, 2010

(51) Int. Cl.
*G06F 1/26* (2006.01)

(52) U.S. Cl.
USPC ........... 713/320; 713/300; 713/323; 713/324; 711/118

(58) Field of Classification Search
USPC .................................. 711/118; 713/300–340
See application file for complete search history.

(56) References Cited

U.S. PATENT DOCUMENTS

| | | | | |
|---|---|---|---|---|
| 5,345,347 | A | | 9/1994 | Hopkins et al. ................. 360/71 |
| 5,481,733 | A | * | 1/1996 | Douglis et al. ................. 713/324 |
| 5,579,186 | A | | 11/1996 | Yamamoto et al. ............. 360/75 |
| 5,682,273 | A | * | 10/1997 | Hetzler ........................... 360/75 |
| 6,018,432 | A | | 1/2000 | Ukani ............................. 360/69 |
| 6,785,083 | B2 | | 8/2004 | Sloan et al. ................. 360/77.02 |
| 6,836,824 | B1 | | 12/2004 | Mirov et al. ................... 711/118 |
| 6,986,064 | B2 | * | 1/2006 | Yoshimoto et al. ........... 713/300 |
| 7,035,155 | B2 | * | 4/2006 | Stimak et al. ................. 365/222 |
| 7,380,147 | B1 | * | 5/2008 | Sun ................................ 713/323 |
| 7,421,591 | B2 | * | 9/2008 | Sultenfuss et al. ............. 713/300 |
| 7,425,810 | B2 | * | 9/2008 | Hobbet et al. ................. 318/560 |
| 7,620,773 | B2 | * | 11/2009 | Nicholson et al. ............. 711/113 |
| 7,634,585 | B2 | * | 12/2009 | Conley et al. ..................... 710/1 |
| 7,725,750 | B2 | * | 5/2010 | Ashish et al. ................. 713/323 |
| 7,849,387 | B2 | * | 12/2010 | Biswas et al. ................. 714/799 |
| 8,112,651 | B2 | * | 2/2012 | Wang et al. ................... 713/323 |
| 8,245,064 | B2 | * | 8/2012 | Fulkerson et al. ............. 713/323 |
| 2006/0069932 | A1 | | 3/2006 | Oshikawa et al. ............. 713/300 |
| 2006/0129703 | A1 | | 6/2006 | Oshikawa et al. ............... 710/14 |
| 2007/0245163 | A1 | * | 10/2007 | Lu et al. ........................ 713/300 |
| 2009/0031156 | A1 | * | 1/2009 | Barth ............................. 713/323 |
| 2009/0307525 | A1 | * | 12/2009 | Hiratsuka et al. ................. 714/8 |
| 2010/0077243 | A1 | * | 3/2010 | Wang et al. ................... 713/323 |

OTHER PUBLICATIONS

"Adaptive Disk Spin-Down for Mobile Computers"—29 pages dated 2000.*
"A Survey of Design Techniques for System-Level Dynamic Power Management"—18 pages dated Jun. 2000.*
"A Predictive System Shutdown Method for Energy Saving of Event-Driven Computation"—16 pages dated Apr. 2000.*
"Self-Learning Hard Disk Power Management for Mobile Devices"—8 pages, No Date Provided.*

* cited by examiner

*Primary Examiner* — Brian Misiura
(74) *Attorney, Agent, or Firm* — Alan G. Rego; Westman, Champlin & Kelly, P.A.

(57) ABSTRACT

Methods and devices are provided for managing the transitions between operating modes in a data device. In an illustrative example, a method includes storing, in a control system for a device, a value for a first interval of time. The value indicates a minimum interval of time required for the device to remain in a lower power operating mode to provide energy savings at least equal to an energy cost associated with transitioning between the lower power operating mode and a higher power operating mode. The method further includes receiving a signal that instructs the device to transition from the lower power operating mode to the higher power operating mode. The method also includes ensuring that the device has remained in the lower power operating mode for at least as long as the first interval of time before it transitions to the higher power operating mode.

12 Claims, 4 Drawing Sheets

ENERGY-EFFICIENT TRANSITIONING AMONG DEVICE OPERATING MODES

FIELD OF THE DISCLOSURE

The present disclosure relates to data devices, and in particular to controlling the operation of a data device to enhance energy efficiency.

SUMMARY

Methods and devices are provided for managing the transitions between operating modes in a data device, to promote power consumption and associated performance advantages while continuing to provide appropriate data access rates, and thereby provide a novel optimization among different performance goals. In an illustrative example, a method includes storing, in a control system for a device, a value for a first interval of time. The value indicates a minimum interval of time required for the device to remain in a lower power operating mode to provide energy savings at least equal to an energy cost associated with transitioning between the lower power operating mode and a higher power operating mode. The method further includes receiving a signal that instructs the device to transition from the lower power operating mode to the higher power operating mode. The method also includes ensuring that the device has remained in the lower power operating mode for at least as long as the first interval of time before it transitions to the higher power operating mode. Various embodiments provide unforeseen advantages and superior performance characteristics over conventional data management systems.

The features described above are illustrative only rather and do not define limitations on various embodiments. Other features and benefits that characterize various embodiments will be apparent from the following detailed description, the associated drawings, and the other disclosure herein.

DETAILED DESCRIPTION

Figure 1:
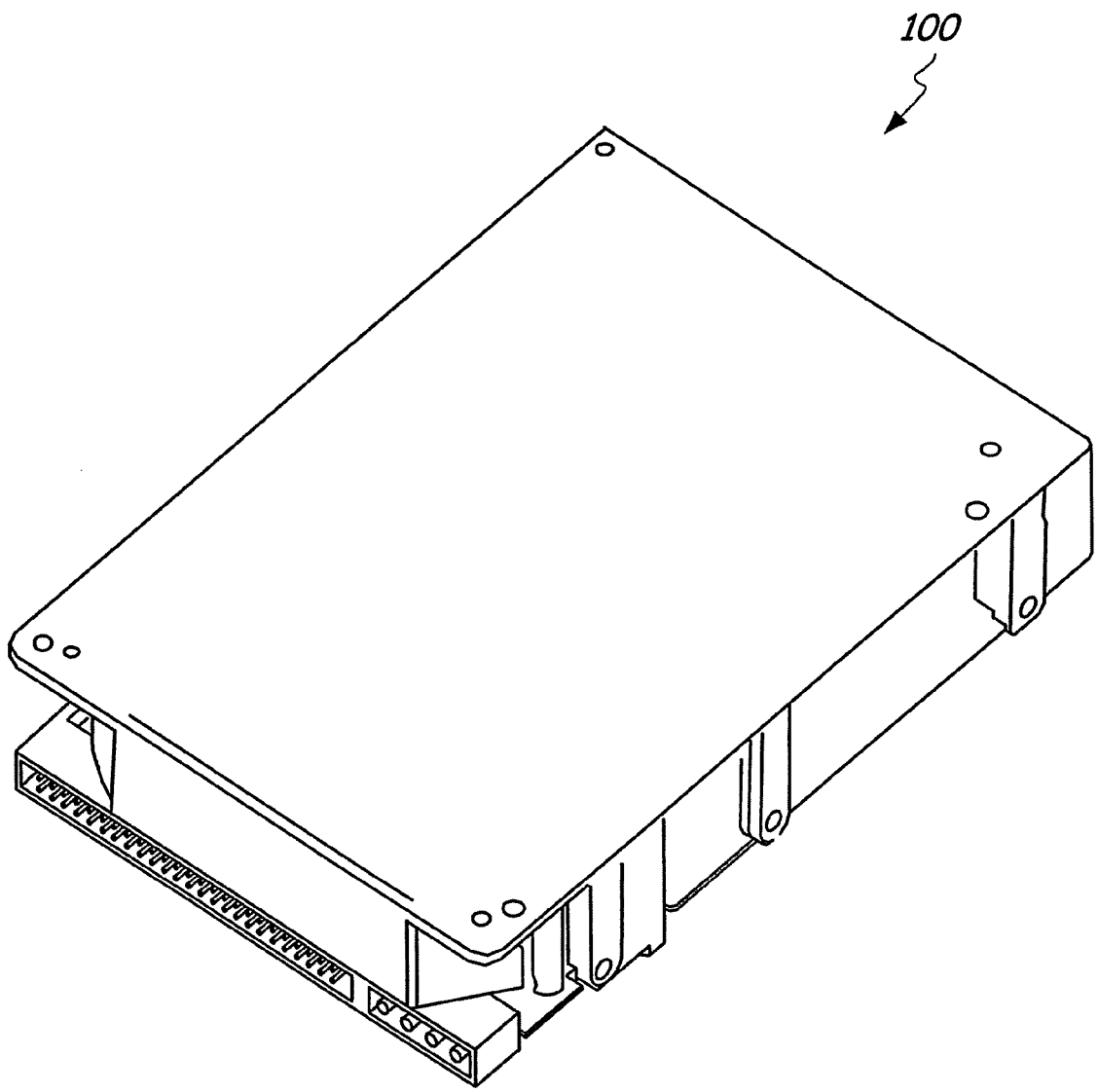
FIG. 1 depicts a data storage device in accordance with an illustrative embodiment.

As an illustrative embodiment, FIG. 1 depicts a data storage device 100. Data storage device 100 may illustratively be incorporated in a handheld, notebook, or laptop computer or other device (not pictured in FIG. 1), for example. Data storage device 100 may have different operating modes that provide different rates of data access between a data storage medium or other data source and other system components, where the operating modes balance data access demands against power conservation and battery life extension. For example, when other system components demand high data access rates, data storage device 100 may operate in a full-power mode to maximize the rate at which it provides data from a storage medium, while when little or no content data from a data storage medium is required by other system components, data storage device 100 may enter an idle operating mode in which it reads a low rate of error correction and servo pattern data, and little or no content data. Data storage device 100 may incorporate a control component, which may illustratively comprise a controller, a processor, a logic circuit, or other elements configured to produce signals for controlling device 100. The control component may incorporate an operating mode management algorithm that enables data storage device 100 to consume a lower level of power, in this illustrative embodiment. This in turn also results in a lower rate of heat production, which also allows for the removal of fans in a laptop or other system in which data storage device 100 is incorporated. Removing the fans also lowers the noise produced by the laptop, and lowers the cost by eliminating components. Lower power consumption by the data storage device 100 also contributes to less enclosure volume due to improved thermal characteristics, and to longer battery life for the laptop.

Figure 2:
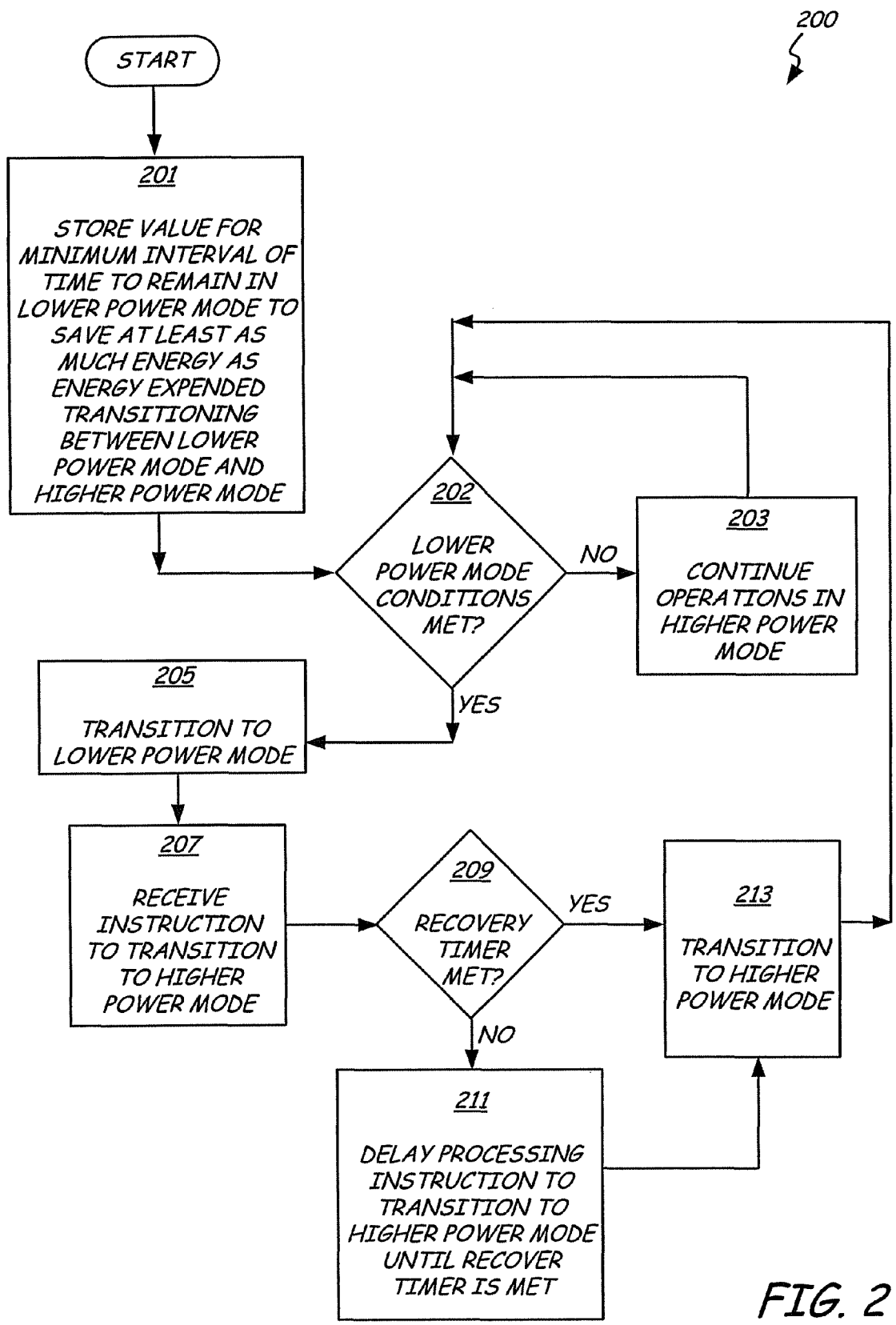
FIG. 2 depicts a flowchart for a method in accordance with an illustrative embodiment.

The operating mode management algorithm that enables data storage device 100 to reduce its power consumption, while flexibly maintaining high data rate delivery and thereby enabling cheaper, smaller, and quieter devices with longer battery life, may be embodied in the illustrative example of method 200, depicted in the flowchart of FIG. 2. Method 200 refers to a lower power operating mode, a higher power operating mode, and a recovery timer. These concepts are illustratively discussed as follows, with reference to the graph of FIG. 3, before the individual steps of method 200 are described in more detail.

Average power consumption for a device may be specified in terms of a command profile. Overall power consumption by a device is the aggregate of the power consumption in various operating modes for the time spent in each of the modes. Improvements in average power consumption may be made by lowering the power consumption of any one of the operating modes, and/or by reducing the time spent in a higher power operating mode in favor of more time spent in a lower power operating mode.

Data storage device 100 may take the form of any of a wide variety of specific data storage technologies, in different embodiments. For example, data storage device 100 may take the form of a disc drive, and the lower and higher power operating modes may be applied to a data interface component such as a read and/or write head mounted on an air bearing slider positioned on a head gimbal assembly proximate to a medium configured for encoding data, such as a magnetoresistive disc, for example. A disc drive may implement a lower power operating mode by such steps as reducing spindle speed, and/or caching write data until a higher power operating mode is put into effect, as illustrative examples. In another illustrative example, data storage device 100 may take the form of a solid state memory device, and the lower and higher power operating modes may be applied to signals in the solid state memory device. A solid state device may implement a lower power operating mode by such steps as temporarily turning off power to one or more sections of an array, and/or reducing a refresh rate of the memory device, as illustrative examples. Any type of device may also implement a lower power operating mode by such steps as running at a lower processor clock speed, that is lower relative to a higher processor clock speed in a higher power operating mode, as another illustrative example. Data storage device 100 may include a control component that is configured to control the data interface component at any of two or more operating modes of which at least a first operating mode draws a relatively lower level of power and at least a second operating mode draws a relatively higher level of power, such as an idle mode and a high-performance mode, for example.

Figure 3:
FIG. 3 depicts a graph of power versus time for a device in accordance with an illustrative embodiment.

FIG. 3 depicts illustrative graph 300 of power consumption versus time, plotted along power axis 320 and time axis 310, during an illustrative series of operating mode transitions for data storage device 100 in accordance with an illustrative example. The lower power and higher power operating modes of method 200 may refer to any device or system that has different options of operating modes in which to operate, where one of the operating modes has a rate of power consumption that is relatively lower than a second operating mode. For example, data storage device 100 may illustratively have both an idle mode that consumes relatively less power, and a performance mode that consumes relatively more power. These modes are illustratively depicted in FIG. 3, in which the corresponding device is in a higher power operating mode during time intervals 301 and 309, and in a lower power operating mode during time interval 305.

The higher power and lower power operating modes may take many forms. In one illustrative example for data storage device 100, a higher power operating mode may be a performance mode configured for reading data that includes content data, and/or configured for a higher rate of error correction and servo pattern data, while a lower power operating mode may be configured for reading only non-content data, and/or for using either no error correction data and/or servo pattern data, and/or a lower rate of error correction data and/or servo pattern data, as an illustrative example. Content data may include data that encodes information stored on the device from a user input or other external source, and/or which may be read to provide output to a user interface or other destination, for example. Non-content data may include data devoted to system operations within the device, such as error correction and servo pattern data, as an illustrative example. Servo pattern data may be directed to controlling the positioning of a read and/or write head, and may include a preamble field, a servo address mark field, a Gray code field, and pattern sensor fields, in an illustrative embodiment. In other embodiments, the different modes may be any device operating modes for any device in which one optional operating mode involves relatively more or less power consumption than another operating mode.

There is also an associated power cost with each transition between operating modes. To transition between the performance idle mode and the low idle mode, the data device's power consumption briefly spikes to a level of power consumption that is still higher than that of the performance idle mode. This transition power spike is seen at brief time intervals 303 and 307 in graph 300, corresponding to operating mode transitions, in which power consumption is at an even higher level than for the higher power operating modes of time intervals 301, 309. Data storage device 100 may transition between the lower power operating mode and the higher power operating mode such that the device consumes an even greater level of power during the transition than it does during the higher power operating mode, though for a short interval of time, such as time intervals 303 and 307. Such transitions between different operating modes may be governed by a controller of a device, for example, which may illustratively be done as a function of operating mode management algorithms in the controller responding to various inputs in other system components with which the device is operatively connected.

After remaining in the lower power operating mode for a period of time, the device may transition from the lower power operating mode back to the higher power operating mode, again as driven by algorithms running in the controller component of the device in this illustrative embodiment. Again, the transition itself, between the lower power operating mode and the higher power operating mode, involves a brief spike in power consumption to a level higher still than that of the performance idle mode.

Therefore, for example, if the data storage device 100 were to transition from the higher power operating mode to the lower power operating mode and then immediately back to the higher power operating mode, with no interval of time spent in the lower power operating mode (as opposed to the depiction of FIG. 3), the power consumption by the device 100 over that entire process would be much higher than if it simply remained in the higher power operating mode. The extra energy expenditures of the two transitions, from higher power mode to lower power mode and back again from lower power mode to higher power mode, are a sunk cost in the device's energy budget once it engages the transition from higher power mode to lower power mode.

Therefore, once the device 100 has transitioned from the higher power operating mode to the lower power operating mode, there is a minimum interval of time that the device 100 must remain in the lower power operating mode before it transitions back to the higher power operating mode to recoup the energy expended on the two transitions, that is, to provide energy savings at least equal to the energy cost associated with transitioning between the lower power operating mode and a higher power operating mode. The device 100 must remain in the lower power operating mode for at least that minimum interval of time to break even in its energy budget, compared with simply remaining in the higher power operating mode. This minimum time interval for remaining in the lower power operating mode to at least recover the sunk cost in energy of the transitions into and out of the lower power operating mode is what is referred to with the recovery timer in method 200. The recovery timer indicates when the minimum interval of time has been met for providing energy savings at least equal to the energy cost associated with transitioning into and out of the lower power operating mode. The device experiences an overall lower power consumption if it continues in the lower power operating mode after the recovery timer has run its course, indicating that the minimum interval of time, for recouping the energy cost of transitioning into the lower power operating mode, has passed.

Method 200 of FIG. 2 provides an illustrative example in this context of managing the transitions between a lower power operating mode and a higher power operating mode with reference to a recovery timer. Method 200 begins with step 201, of storing, in a control system for a device, a value for a first interval of time, wherein the value indicates a minimum interval of time required for the device to remain in a lower power operating mode to provide energy savings at least equal to an energy cost associated with transitioning between the lower power operating mode and a higher power operating mode.

Method 200 then includes conditional node 202 of checking whether conditions have been met to instruct a device to transition to a lower power operating mode. If the answer is "no", this leads to step 203 of continuing operations in the higher power operating mode. If the answer is "yes", this leads to step 205 of transitioning to the lower power operating mode and beginning the recovery timer.

This is followed at some future point by step 207, of receiving a signal that instructs the device to transition from the lower power operating mode to the higher power operating mode. Step 207 is followed with conditional node 209, of checking whether the recovery timer is met, that is, whether the minimum interval of time measured out by the recovery timer has passed since the device transitioned to the lower power operating mode. If the recovery timer has been met, conditional node 209 is followed by step 213, of processing the instruction to transition to the higher power operating mode. If the recovery timer has not yet been met, conditional node 209 is followed by step 211, of delaying the processing of the instruction to transition to the higher power operating mode, until the recovery timer is met, and then executing step 213, of processing the instruction to transition to the higher power operating mode. Step 211 may involve overriding any competing instructions the device receives to transition back to the higher power operating mode before the data device has remained in the lower power operating mode for at least the calculated time interval, for example. Step 213 may be followed by returning to conditional node 202 of checking whether conditions have been met to instruct a device to transition to a lower power operating mode.

In this way, method 200 ensures that the device has remained in the lower power operating mode for at least as long as the minimum interval of time before it transitions to the higher power operating mode, in accordance with this illustrative embodiment.

Figure 4:
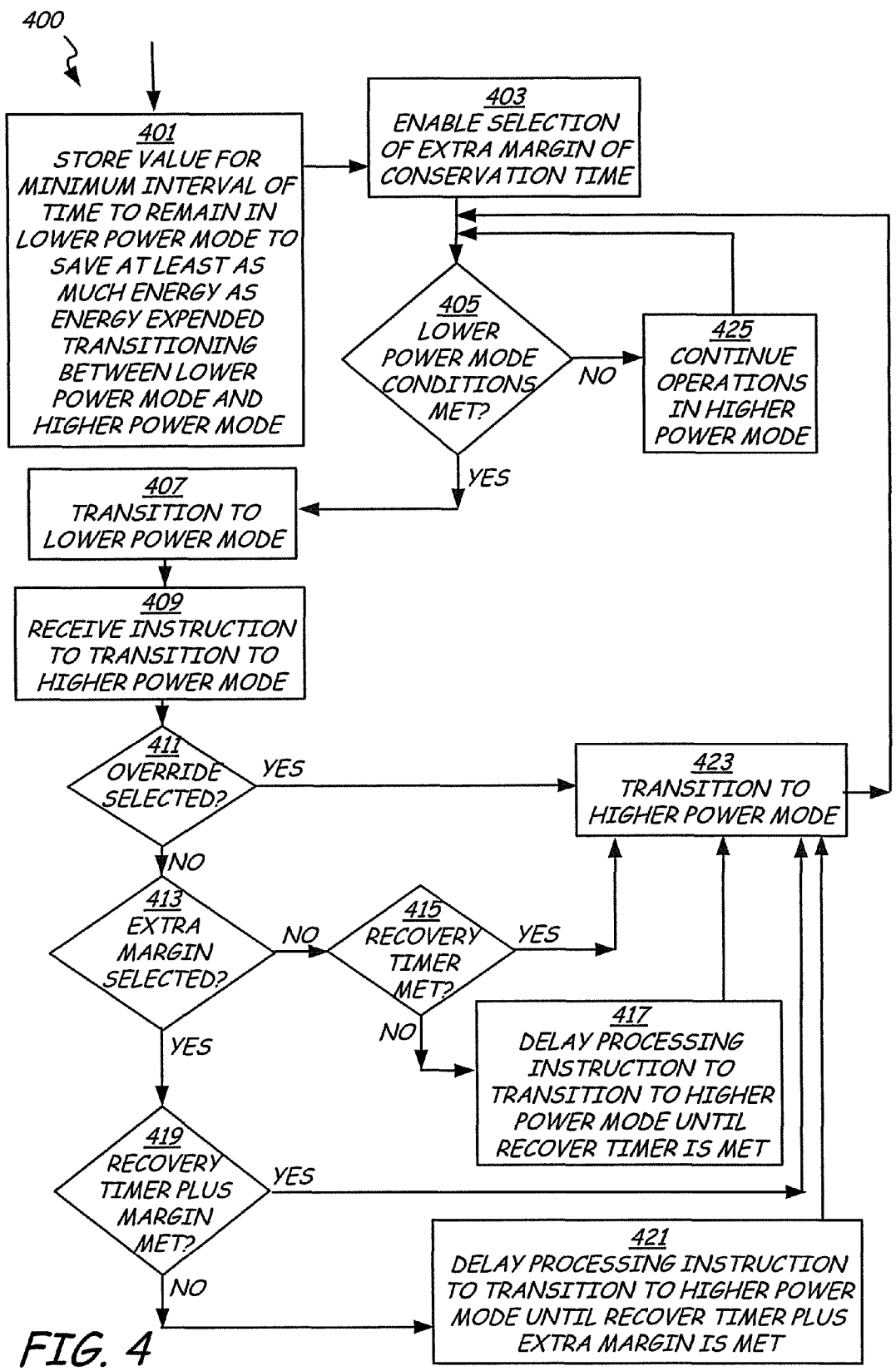
FIG. 4 depicts a flowchart for a method in accordance with an illustrative embodiment.

FIG. 4 provides another illustrative example of managing the transitions between a lower power operating mode and a higher power operating mode with reference to a recovery timer, with reference to illustrative method 400. Illustrative method 400 is directed to a data storage device, and includes additional options compared to method 200.

Method 400 begins with step 401, of storing, in a control system for a device, a value for a first interval of time, wherein the value indicates a minimum interval of time required for the device to remain in a lower power operating mode to provide energy savings at least equal to an energy cost associated with transitioning between the lower power operating mode and a higher power operating mode, in this illustrative embodiment.

Method 400 then includes step 403 of enabling the selection of an extra margin of time for remaining in the lower power operating mode, beyond the minimum interval of time required to recoup the energy required for transitioning into the lower power operating mode and back to the higher power operating mode. This extra margin of time can be used to ensure that any transition to the lower power operating mode does not just break even in terms of the net energy consumption, but provide at least a minimum net energy savings. This extra margin of time may be preselected during the manufacture of the data device, and encoded in firmware stored and executed on a control component of the device, for example. In another illustrative example, the extra margin of time may be user-selectable, such that the device, or its control component, is configured to receive updated user inputs to select or otherwise modify the additional margin of time, or the additional margin of energy savings provided by that additional margin of time, in this illustrative embodiment.

Method 400 then includes conditional node 405 of checking whether conditions have been met to instruct a device to transition to a lower power operating mode. If the answer is "no", this leads to step 425 of continuing operations in the higher power operating mode. The device may remain operating in the higher power mode for a set period of time before again checking whether the conditions are met for transitioning to the lower power mode, or the device may be set so that specific conditions in its operations actively trigger a transition into the lower power operating mode, without waiting for a timed evaluation of whether such conditions are met. If the answer to conditional node 405 is "yes", this leads to step 407 of transitioning to the lower power operating mode and beginning the recovery timer, in this illustrative embodiment.

Step 407 is followed at some future point by step 409, of receiving a signal that instructs the device to transition from the lower power operating mode to the higher power operating mode. Step 409 is followed with conditional node 411, of checking whether a transition management override has been selected. This override might be selected by a user, or might be automatically selected by certain applications, under conditions where operational speed is a particularly higher priority than managing energy consumption. An override might also be available for immediate selection, so that a user input may select to override the operating mode management algorithm at any time, and force the device into a high power operating mode. If the override is selected, the device may then pass immediately to step 423 of transitioning to a higher power operating mode, in this illustrative embodiment.

If the override is not selected, method 400 may then go to conditional node 413 of checking whether an extra margin of time is selected, as in step 403. If an extra margin of time has not been selected, method 400 may then go to conditional node 415, of checking whether the recovery timer has been met, that is, whether the minimum interval of time measured out by the recovery timer has passed since the device transitioned to the lower power operating mode. If the extra margin of time has been selected, then method 400 may go to conditional node 419, of checking whether the recovery timer plus the extra margin of time have been met. If the appropriate interval of time has passed, either the recovery timer alone as in node 415 or the recovery timer plus the extra margin as in node 419, then the device may process the instruction to transition to the higher power operating mode, as in step 423. If the method is at node 415 and the recovery timer has not yet been met, the method may go to step 417 of delaying processing the instruction to transition to the higher power mode until the recovery timer is met, and then going to step 423 of transitioning to the higher power operating mode. If the method is at node 419 and the recovery timer plus the extra margin of time have not yet been met, the method may go to step 421 of delaying processing the instruction to transition to the higher power mode until the recovery timer plus the extra margin of time is met, i.e. that the minimum interval of time timed by the recovery timer plus the extra margin of time have passed, and then going to step 423 of transitioning to the higher power operating mode, in this illustrative embodiment. Steps 417 and 421 may also include overriding other, competing instructions that may be received with instructions to enter a higher power operating mode sooner, and the override for remaining in the lower power operating mode may be accepted as an instruction of higher priority. This override may also be subordinate to other instructions of a still higher priority, such as a user input override of the operating mode management algorithm or a system reset, that instructs the device to enter the higher power operating mode.

From step 423, the method may then return to conditional node 405 of checking whether the lower power conditions are met, either passively at regular intervals of time, or as induced by an active trigger to transition to the lower power mode. If the extra margin of time is user-selectable or otherwise configurable through ongoing operations, the method may also involve going from step 423 of transitioning to the higher power operating mode back to step 403 of enabling a new selection of an extra margin of conservation time, prior to checking whether the conditions are met for transitioning to the lower power operating mode. Step 403 may be regularly enabled in parallel to the conditional node 405 or other steps of method 400, so that the margin of time can also be adjusted at any time, according to an illustrative embodiment.

A device may also be configured to operate in three or more different levels of power, rather than only two, and various other methods may be embodied analogous to those described above but applied to three or more different operating modes with three or more different levels of power consumption. Such a method may illustratively include ensuring, when the device receives a signal that instructs the device to transition from a first one of the operating modes to a second one of the operating modes having a higher power, that the device has remained in the first operating mode for an interval of time sufficient to provide energy savings at least equal to an energy cost associated with transitioning between the first operating mode and the second operating mode before it transitions to the second operating mode. As an illustrative example of this as applied to data storage device 100, the device may have three different standard operating modes: a high-performance operating mode, a performance idle operating mode, and a low idle operating mode, where the high-performance operating mode may be used during periods with high rates of reading and writing content data; the performance idle may involve high rates of reading and/or writing servo pattern, error correction, and system maintenance data and a state of high readiness to re-enter the high-performance mode, and be used generally if a short interval has passed without user inputs or other instructions for reading and writing content data; and the low idle mode may involve only low rates of reading servo pattern and/or error correction and/or system maintenance data, and be used when a relatively long interval has passed without user inputs or other instructions for reading and writing content data, or when otherwise provided by command instructions. A method as described herein may be applied to any or all of these operating modes, to ensure that a transition to any operating mode having a lower power rate level than the prior operating mode is followed by at least a sufficient amount of time, with or without an additional margin, to recoup the energy consumed in transitioning to the lower power operating mode and then to a higher power operating mode.

A method may also include the initial steps of evaluating the amount of extra energy expended when a data device transitions between a higher power operating mode and a lower power operating mode, evaluating the rate at which power is saved in the lower power operating mode relative to the higher power operating mode, and calculating the time interval equal to the amount of extra energy expended when the data device transitions divided by the rate at which power is saved in the lower power operating mode, to determine the minimum interval of time for keeping the device in the lower power operating mode, in an illustrative embodiment that may be used during initial assembly of the device, for example. The instructions may then be provided to and stored on the device, such as on a control component of the device, to remain in the lower power mode for at least the calculated time interval whenever it enters the lower power mode, prior to transitioning to the higher power mode.

In a specific illustrative example, a data storage device may have a low idle mode that consumes a relatively lower level of power, and a performance idle mode that consumes a relatively higher level of power. When transitioning from the performance idle mode to the low idle mode and back, the device may need to remain in the low idle mode for a minimum interval of time of 38 milliseconds to recoup the extra energy of those transitions, so it must remain in the low idle mode for at least 38 milliseconds to ensure that the entire process of transitioning from the performance idle mode to the low idle mode and back results in a net reduction in power consumed. The data storage device may receive a command stream of random small block writes to a data storage medium, with an inter-command delay of 110 milliseconds, where the small block writes require the data storage device to be in at least the performance idle mode, and cannot be performed in the low idle mode. The time interval for the transitions and the time interval for each small block write are such that the inter-command delay of 110 milliseconds is just enough so that if the device transitions from the performance idle mode to the low idle mode as soon as it finishes one small block write, it receives the next instruction to perform a small block write. If the device's command component did not have an algorithm encoding a transition energy management method as disclosed herein, it would respond to this series of instructions by transitioning from performance idle to low idle and then immediately transitioning from low idle back to performance idle to begin the next small block write. Instead, using a method as disclosed herein, the device persists in the low idle mode for at least 38 milliseconds, and longer if an extra margin of savings is in effect, after each transition to the low idle mode. This ensures that even under a worst-case scenario, the device never uses more energy overall by transitioning to lower power operating modes. And if an extra margin of savings is selected, such a method ensures that the device always uses less energy overall when it transitions to lower power operating modes.

The present disclosure therefore includes unexpected and novel advantages as detailed herein and as can be further appreciated from the claims, figures, and description by those skilled in the relevant art. Although some of the embodiments are described in reference to a data storage medium or a data storage system, or to even more particular embodiments such as a disc or a disc drive, the present disclosure encompasses various other embodiments with application to other data storage technologies and a wide variety of other types of devices. Additionally, it is understood that references to a read head or a head may be illustrative examples of a read and/or write head of any type.

It is to be understood that even though numerous characteristics and advantages of various illustrative embodiments of the disclosure have been set forth in the foregoing description, together with details of the structure and function of various embodiments of the disclosure, this disclosure is illustrative only, and changes may be made in detail, especially in matters of structure and arrangement of parts within the principles of the present disclosure, to the full extent indicated by the broad, general meaning of the terms in which the appended claims are expressed. It will be appreciated by those skilled in the art that the teachings of the present disclosure can be applied to a family of systems, devices, and means encompassed by and equivalent to the examples of embodiments described, without departing from the scope and spirit of the present disclosure. Further, still other applications for various embodiments, including embodiments pertaining to data storage media and data storage systems, are comprised within the present disclosure.

What is claimed is:

1. A method comprising:
    operating a data device in a lower power operating mode and a higher power operating mode;
    providing a power transition management override having a selected state and an unselected state in the data device; and
    when the power transition management override is in the unselected state, controlling a transition from the lower power operating mode to the higher power operating mode to ensure that the data device remains in the lower power operating mode for at least as long as a minimum interval of time, which is sufficient to provide energy savings at least equal to an energy cost associated with transitioning from the lower power operating mode to the higher power operating mode, plus an additional margin of time before it transitions to the higher power operating mode, in which the additional margin of time is at least one of:
preselected during manufacture of the data device; or
user-selectable, such that the data device is configured to receive updated user inputs to select the additional margin of time.

2. The method of claim 1, wherein the lower power operating mode is configured for reading only non-content data, and the higher power operating mode is configured for reading data that includes content data.

3. The method of claim 1, wherein the higher power operating mode is configured for a first rate of error correction data, and the lower power operating mode is configured for using either no error correction data or a second rate of error correction data that is lower than the first rate.

4. The method of claim 1, wherein the higher power operating mode is configured for a first rate of servo pattern data, and the lower power operating mode is configured for using either no servo pattern data or a second rate of servo pattern data that is lower than the first rate.

5. The method of claim 1, wherein the lower power operating mode comprises turning off power to one or more sections of an array of a solid state memory device, and the higher power operating mode comprises providing power to one or more sections of an array that had been turned off.

6. The method of claim 1, wherein the lower power operating mode and the higher power operating mode comprise implementing lower and higher refresh rates, respectively, in a solid state memory device.

7. The method of claim 1, wherein the lower power operating mode and the higher power operating mode comprise implementing lower and higher processor clock speeds, respectively.

8. The method of claim 1, wherein the data device is configured to operate at operating modes with any of three or more different levels of power, and the method comprises ensuring, when the data device receives a signal that instructs the data device to transition from a first one of the operating modes to a second one of the operating modes having a higher power, that the data device has remained in the first operating mode for an interval of time sufficient to provide energy savings at least equal to an energy cost associated with transitioning between the first operating mode and the second operating mode before it transitions to the second operating mode.

9. The method of claim 1, wherein the minimum interval of time is sufficient to provide energy savings at least equal to an energy cost associated with transitioning from the higher power operating mode to the lower power operating mode, and back again from the lower power operating mode to the higher power operating mode.

10. A data device comprising:
a power transition management override having a selected state and an unselected state; and
a control component configured to:
determine whether the power transition management override is in the unselected state and, upon determining that the power transition management override is in the unselected state, configured to operate the data device in a lower power operating mode for at least as long as a minimum interval of time before the control component controls the data device to transition to a higher power operating mode;
control the data device such that the minimum interval of time is at least sufficient to compensate for energy lost in transitioning from the higher power operating mode to the lower power operating mode and from the lower power operating mode back to the higher power operating mode, plus an additional margin of time sufficient to provide an additional margin of energy savings; and
receive user inputs to modify the additional margin of energy savings.

11. A method comprising:
operating a data device in a lower power operating mode and a higher power operating mode; and
controlling a transition from the lower power operating mode to the higher power operating mode such that the data device remains in the lower power operating mode for at least as long as an energy break-even time interval plus an additional margin of time before it transitions to the higher power operating mode,
wherein the additional margin of time is:
preselected during manufacture of the data device; or
user-selectable; or
user-modifiable; or
encoded in firmware in the data device.

12. A data device comprising:
a control component configured to:
operate a data device in a lower power operating mode and a higher power operating mode; and
control a transition from the lower power operating mode to the higher power operating mode such that the data device remains in the lower power operating mode for at least as long as an energy break-even time interval plus an additional margin of time before it transitions to the higher power operating mode,
wherein the additional margin of time is:
preselected during manufacture of the data device; or
user-selectable; or
user-modifiable; or
encoded in firmware in the data device.

* * * * *